United States Patent Office 3,299,190
Patented Jan. 17, 1967

3,299,190
O,O-DIALKYL-O-DICHLOROVINYL
PHOSPHATES
Gerhard Schrader, Wuppertal-Cronenberg, Germany, assignor to Farbenfabriken Bayer Aktiengesellschaft, Leverkusen, Germany, a German corporation
No Drawing. Filed Nov. 19, 1963, Ser. No. 324,882
Claims priority, application Germany, Jan. 23, 1962,
F 35,829
5 Claims. (Cl. 260—957)

This application is a continuation-in-part of Serial No. 247,824, filed December 28, 1962, now abandoned.

Trialkyl phosphites in which one alkoxy group is derived from the radical of a secondary alcohol have not yet been described in the literature.

These asymmetrical trialkyl phosphites can now easily be obtained in the following manner:

Any secondary alcohol can be reacted with phosphorus trichloride to form the corresponding alkylphosphorous acid dichloride (I). This is then further reacted with 2 mols of a primary alcohol in the presence of 2 mols of a tertiary base to form II:

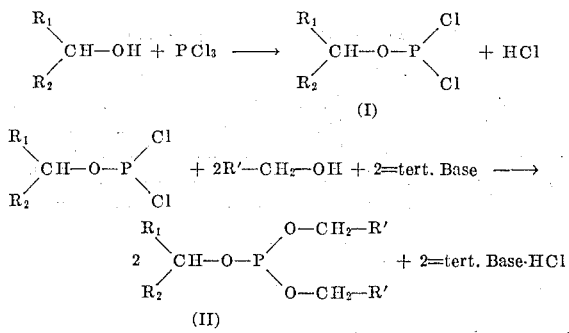

In the compound class II, the radical of the secondary alcohol has a stronger linkage to the phosphorus than the radicals of the primary alcohols. As a result, the radical of the secondary alcohol is retained by the phosphorus atom, whilst the radical of a primary alcohol is eliminated as alkyl chloride, in the action of chloral on trialkyl phosphites of type II.

The process takes place in the following manner:

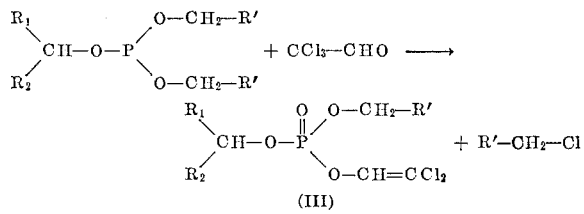

The compound class III is thus obtained which has not yet been described in the literature and the members of which are distinguished by excellent insecticidal action. The new compounds of the invention are characterised by the above Formula III. In this formula $R_1$ and $R_2$ separately stand for alkyl groups, such as methyl, ethyl, propyl, butyl, isopropyl, sec. butyl and tert. butyl, $R_1$ and $R_2$ stand jointly for alkylene bridges with 4 to 5 carbon atoms and R' stands for alkyl groups containing 1 to 4 carbon atoms, such as methyl, ethyl, propyl and butyl, as well as preferably for a hydrogen atom.

The inventive step of the above reaction equations is the conversion of the trialkyl phosphorous acid ester of the Formula II to the O.O-dialkyl-O-dichloro-vinyl phosphates of the Formula III.

The reaction of chloral with the above-mentioned O,O,O-trialkyl phosphites of the type II takes place in an exothermic process. It is expedient to operate in a strong dilution, in order to remove the heat evolved. As diluting agents, hydrocarbons, such as benzene, toluene and halogenated hydrocarbons, such as chlorobenzene etc. have proved suitable.

It is moreover, expedient to provide external cooling so that the course of the reaction takes place at 20–40° C. The products according to the invention of the substance class III are thus obtained in high yields.

The new dichlorovinyl phosphates are to be employed as pest control agents.

More particularly the compounds according to the invention are to be employed as active agents in controlling insects, such as flies, mosquitos, beetles, aphids and further spider mites, such as the two-spotted spider. The compounds of the invention can be employed against insects in all their various stages of development, for instance, against the insects or larvae thereof.

In the following table there is represented the pesticidal activity of some of the compounds according to the invention.

The pesticidal compounds are employed in the form of aqueous emulsions which are prepared by admixing the active ingredient with the same amount of dimethyl formamide adding about 20%, referred to the active ingredient of an emulsifier, and diluting at last this premixture with water to the desired concentration.

TABLE

| Compounds | Pests | Concentration in percent (active ingredient/water) | Killing rate in percent |
|---|---|---|---|
| Example 1 | Caterpillars | 0.001 | 100 |
|  | Mosquito larvae | 0.000001 | 90 |
|  | Flies | 0.0001 | 100 |
|  | Larvae of flies | 0.0001 | 100 |
| Example 2 | Caterpillars | 0.001 | 100 |
|  | Aphids (systemic action) | 0.1 | 100 |
|  | Grain weevil | 0.001 | 100 |
| Example 3 | Caterpillars | 0.001 | 100 |
|  | Flies | 0.0001 | 90 |
|  | Mosquito larvae | 0.00001 | 100 |

The following examples are given for the purpose of illustrating the invention.

Example 1

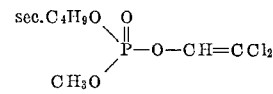

83 g. (0.5 mol) of sec.-butyl-O,O-dimethyl phosphite (B.P. 52° C./12 mm. Hg) are dissolved in 300 cc. of benzene. 74 g. of chloral, dissolved in 100 cc. of benzene, are added dropwise with stirring at an internal temperature of 20–25° C. After the dropwise addition of chloral, stirring is continued for 1 hour at room temperature and the benzene solution then washed through with 200 cc. of ice water. The benzene solution is subsequently dried with sodium sulphate and subjected to fractional distillation. 100 g. of O-sec.-butyl-O-methyl-O-dichlorovinyl phosphate of B.P. 92° C./1 mm. Hg are thus obtained. Yield 76% of the theoretical. The new ester is a colourless water-insoluble oil.

Example 2

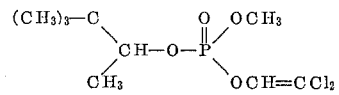

97 g. (0.5 mol) of O-pinacolyl-O,O-dimethyl phosphite (B.P. 48° C./2 mm. Hg) are dissolved in 400 cc. of benzene. 74 g. of chloral are added dropwise to this solution with stirring at 25° C. After the strongly exothermic reaction has subsided, stirring is continued for 1 hour at room temperature and the mixture worked up as described in Example 1. 115 g. of O-pinacolyl-O-methyl-O-dichlorovinyl phosphate of B.P. 74° C./0.01 mm. Hg are thus obtained. Yield 79% of the theoretical. The new ester is a colourless water-insoluble oil.

*Example 3*

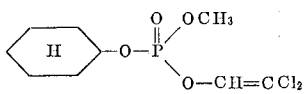

96 g. (0.5 mol) of O-cyclohexyl-O,O-dimethylphosphite (B.P. 72° C./3 mm. Hg) are dissolved in 400 cc. of benzene. 74 g. of chloral are added dropwise with stirring to this solution. After the reaction has subsided, the product is stirred at room temperature for a further hour. The reaction product is subsequently worked up in the usual manner. 121 g. of O-cyclohexyl-O-methyl-O-dichlorovinyl phosphate of B.P. 89° C./0.01 mm. Hg are obtained in this manner. Yield 84% of the theoretical. The new ester is a colourless water-insoluble oil.

*Example 4*

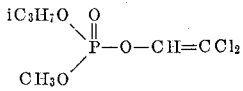

76 g. (0.5 mol) of O-isopropyl-O.O-dimethyl phosphite (B.P. 38° C./12 mm. Hg) are dissolved in 300 cc. of benzene. 64 g. of chloral are added dropwise to this solution while stirring. After the dropwise addition of chloral, stirring is continued for 1 hour and the reaction mixture thus obtained is washed twice with 100 cc. of water. The benzene solution is separated and dried with sodium sulphate and subjected to fractional distillation. 92 g. of O-methyl-O-isopropyl-O-dichlorovinyl phosphate of B.P. 92° C./3 mm. Hg are obtained. Yield 74% of the theoretical. The new ester is a colourless water-insoluble oil.

I claim:
1. A compound of the formula

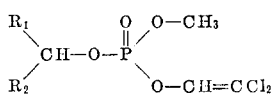

in which $R_1$ and $R_2$ separately stand for alkyl groups containing 1 to 4 carbon atoms and $R_1$ and $R_2$ jointly stand for alkylene bridges containing 4 to 5 carbon atoms.

2.

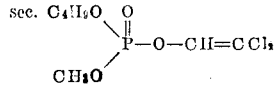

3.

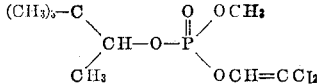

4.

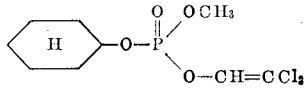

5.

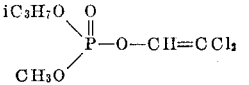

References Cited by the Examiner

UNITED STATES PATENTS

| | | | |
|---|---|---|---|
| 2,915,429 | 12/1959 | Scherer et al. | 167—22 |
| 2,956,073 | 10/1960 | Whetstone et al. | 260—957 |
| 2,968,591 | 1/1961 | Tracy | 167—22 |
| 3,017,422 | 1/1962 | Thompson | 260—461 |
| 3,079,417 | 2/1963 | Farrar | 260—461 |

FOREIGN PATENTS

| | | |
|---|---|---|
| 783,360 | 9/1957 | Great Britain. |
| 744,360 | 2/1960 | Great Britain. |

CHARLES B. PARKER, *Primary Examiner.*

JOSEPH P. BRUST, *Examiner.*

R. L. RAYMOND, *Assistant Examiner.*